United States Patent
Yeom

(10) Patent No.: US 6,526,108 B1
(45) Date of Patent: Feb. 25, 2003

(54) METHOD FOR BUFFERING THE JITTER PROCESSING OF VOCODER

(75) Inventor: Eung-Moon Yeom, Kyonggi-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/467,686

(22) Filed: Dec. 21, 1999

(30) Foreign Application Priority Data

Dec. 23, 1998 (KR) ............................................. 98-57868

(51) Int. Cl.$^7$ ................................................ H04L 7/04
(52) U.S. Cl. ........................ 375/371; 375/372; 704/201
(58) Field of Search ................................ 375/357, 371, 375/372; 704/200, 201, 226, 228, 501, 504; 369/13.05, 27.01, 30.01, 30.23, 47.15

(56) References Cited

U.S. PATENT DOCUMENTS

| | | | | |
|---|---|---|---|---|
| 4,193,123 A | * | 3/1980 | Meinke | 714/55 |
| 4,841,574 A | * | 6/1989 | Pham et al. | 704/201 |
| 5,218,710 A | * | 6/1993 | Yamaki et al. | 704/278 |
| 6,035,009 A | * | 3/2000 | Shudo | 375/372 |

* cited by examiner

Primary Examiner—Chi Pham
Assistant Examiner—Khanh Tran
(74) Attorney, Agent, or Firm—Steve Cha; Cha & Reiter

(57) ABSTRACT

A method for processing received voice data in a voice data processing system including a receiving buffer. The method comprising steps of generating an interruption for processing the received voice data at stated periods; determining whether the receiving buffer has received the voice data; setting an approval bit of the receiving buffer to a voice data read prevention value when there is no received voice data; setting the approval bit to a voice data read approval value when there is received voice data; determining whether a predetermined amount of voice data is accumulated in the receiving buffer when the approval bit is set to the voice data read prevention value; setting the approval bit to the voice data read approval value when the predetermined amount of voice data is accumulated in the writing buffer; and, reading the voice data written in a read address of the receiving buffer and writing the read voice data in a digital signal processor in an upper layer when the approval bit is set to the voice data read approval value.

4 Claims, 4 Drawing Sheets

METHOD FOR BUFFERING THE JITTER PROCESSING OF VOCODER

CLAIM OF PRIORITY

This application makes reference to, incorporates the same herein, and claims all benefits accruing under 35 U.S.C. Section 119 from an application for METHOD FOR BUFFERING JITTER PROCESSING OF VOCODER filed in the Korean Industrial Property Office on Dec. 23, 1998 and there duly assigned Serial No. 98-57868.

BACKGROUND OF THE INVENTION

1. Field of the Invention

The present invention relates generally to a voice data processing system, and in particular, to a method for buffering the received voice data to eliminate the delay and jitter to support the natural processing of a vocoder.

2. Description of the Related Art

In general, an effective and high-speed data transmission is very important in a communication network. With regard to the bandwidth for data transmission, the voice data does not require a wide bandwidth because the voice data can be compressed from 64 Kbps to 16 Kbps by digital encoding (or compressing). However, for video data transmission, a data transfer rate of about 1.5–6 Mbps is required, and the video compression technique as set forth by MPEG (Moving Picture Experts Group) is used to compress the video data while maintaining high quality. In addition, for data communication, an additional bandwidth of over 10 Mbps is required.

However, for effective and high-speed data transmission, the network should be able to satisfy the communication quality required by the respective transmission media as well as the wide bandwidth requirement. The communication quality is referred to as a quality of service (QoS), which depends on the media and applications. For example, in an internet phone service, the quality of service depends on the ability to transmit the voice data in real time from the transmission side to the receiving side with a little delay as possible, and the ability to retrieve the voice data at the receiving side from the transmission side with as little jitter as possible.

Accordingly, many efforts have been made to improve the QoS in the data transmission system, especially to minimize the jitter problem. With regard to the operation of the data transmission system to improve the transmission of the voice data, a controlled transmission environment is created to enhance the transmission through a protocol prior to the transmission of the compressed voice data. The controlled transmission environment is set by determining the type of packets to be transmitted and the type of transmission method. For example, when the transmission line exhibits a good transmission quality, a transmission packet is assembled by adding a plurality of data cells to a given header prior to transmission. On the other hand, the transmission packet is assembled with a fewer number of data cells to a given header when a poor transmission quality exists. The purpose of such implementation is to improve the transmission efficiency by attaching a plurality of data cells to one header rather than attaching one data cell to one header to a data cell.

However, when using the above method, the initial setup is maintained until the call ends, thereby causing the following problems:

(1) when receiving the voice data through a LAN (Local Area Network) with an irregular bandwidth the voice data is not received at regular intervals, thus the low delay and jitter requirement cannot be satisfied;

(2) the voice data is reproduced intermittently, thus deteriorating the quality of a call; and, (3) the writing DSP (Digital Signal Processor) has a longer waiting time, reducing, the system efficiency.

SUMMARY OF THE INVENTION

It is, therefore, an object of the present invention to provide a method for buffering a specific frame before the receiving side of a voice codec processes the frame, thus satisfying the low delay and jitter requirement and reducing the transmission delay.

It is another object of the present invention to provide a method for enabling the codec of a receiving side of the system to synchronously process the received voice data frames, thereby to improve the voice reception characteristic.

It is further object of the present invention to provide a method for continuously retrieving the voice data accumulated in a receiving buffer when a predetermined amount of voice data is written in the receiving buffer.

To achieve the above objects, a method is provided for processing the received voice data in a voice data processing system having a receiving buffer. The method comprising the steps of: (a) generating an interruption signal for processing the received voice data at a predetermined interval; (b) determining whether the receiving buffer has the received the voice data; (c) setting an approval bit of the receiving buffer to a voice data read prevention value when the received voice data does not exist; (d) setting the approval bit to a voice data read approval value when the voice data exists; (e) determining whether a predetermined amount of voice data is accumulated in the receiving buffer when the approval bit is set to the voice data read prevention value; (f) setting the approval bit to the voice data read approval value when the predetermined amount of voice data is accumulated in the writing buffer; and, (g) reading the voice data written in a read address of the receiving buffer, and writing the read voice data in a digital signal processor in an upper layer when the approval bit is set to the voice data read approval value.

Preferably, according to the embodiment of the present invention, the step (b) comprises the step of determining that there is no received voice data when a read address and a write address of the receiving buffer are identical to each other, otherwise determining that there is received voice data. Preferably, according to the embodiment of the present invention, the step (e) comprises the step of determining that the predetermined amount of the voice data is accumulated when the difference between the read address and the write address is larger than a predetermined value, otherwise determining that the predetermine amount of the voice data is not accumulated.

A BRIEF DESCRIPTION OF THE DRAWINGS

The above and other objects, features and advantages of the present invention will become more apparent from the following detailed description when taken in conjunction with the accompanying drawings in which.

A DETAILED DESCRIPTION OF THE PREFERRED EMBODIMENT

A preferred embodiment of the present invention will be described herein below with reference to the accompanying drawings. For the purpose of clarity, well-known functions or constructions are not described in detail since they would obscure the invention in unnecessary detail.

A description of the present invention will be made with reference to a system which transmits the voice data using a vocoder. The vocoder supports the compression technique as set forth in the ITU-T (International Telecommunication Union-Telecommunication standardization sector) Recommendation G. 723.1 and G.729.

The most important difference between the compression technique specified in the ITU-T Recommendation G.723.1 and the compression technique specified in the ITU-T Recommendation G.729 is a sampling period, which is an important factor in compressing the voice data. The G.723.1 compression technique transmits the voice data by 20 or 24 bytes at the sampling period of 30 ms, and the G.729 compression technique transmits the voice data by 10 bytes at the sampling period of 10 ms. Accordingly, the receiving side disassembles the received voice data at every 30 ms or 10 ms depending on the compression technique selected.

However, when the voice data is transmitted through a LAN having an irregular bandwidth, the voice data can not be received at either the 30 ms or 10 ms interval as set forth by one of the ITU recommendations, causing deterioration in the transmission quality.

Therefore, according to the embodiment of the present invention, a specific frame is buffered before the voice codec of the receiving side processes the received voice data in a way to reduce the transmission delay and the voice codec of the receiving side synchronously processes the received frame, thus improving the voice quality.

Figure 1:
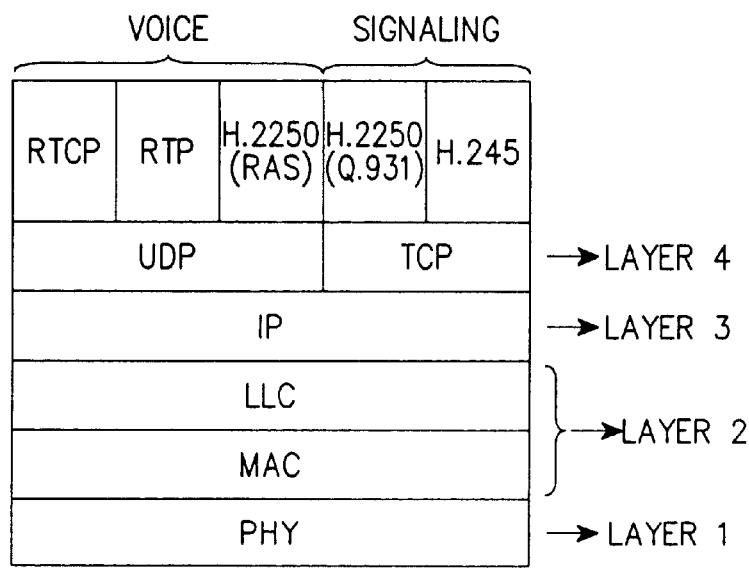
FIG. 1 is a diagram illustrating an OSI (Open Systems Interconnection) reference model to which the present invention is applied.

First, with reference to FIGS. 1 and 2, a description will be made regarding an operation of the system to which the present invention will be applied. FIG. 1 shows an OSI (Open Systems Interconnection) reference model having multi-layered function blocks in a voice transmission system, and FIG. 2 shows a protocol performed between the transmission side and the receiving side to transmit the voice data.

In FIG. 1, the OSI reference model includes a physical (PHY) layer for the first layer; a medium access control (MAC) layer and a logical link control (LLC) layer for the second layer; an internet protocol (IP) for the third layer; a user datagram protocol (UDP) and a transmission control protocol (TCP) for the fourth layer; and a real-time transport control protocol (RTCP), a real-time transport protocol (RTP), H.2250 (RAS), H.2250 (Q.931) and H.245 for the upper layer. The upper layer and the fourth layer are divided into a voice processing path and a signaling path. The voice processing path includes the RTCP, RTP, H.2250 (RAS), and UDP, and the signaling path includes the H.2250 (Q.931), H.245, and TCP. The H.2250 (Q.931) performs the call signaling, and the H.2250 (RAS) performs the verification procedure, and H.245 performs the call control.

In this structure, the headers corresponding to the layers are attached to the voice data when the voice data to be transmitted passes the respective layers. That is, for the voice data, the headers are added by the RTCP, RTP, H.2250 (RAS) and UDP and then provided to the IP. For the signaling data, the headers are added by H.2250 (Q.931), H.245 and TCP and then provided to the IP. Thereafter, the headers are added to the same layers, and the header-added voice data packet is transmitted to the receiving side's system through the physical layer PHY. The receiving side's system acquires the voice data in the reverse order.

Figure 2:
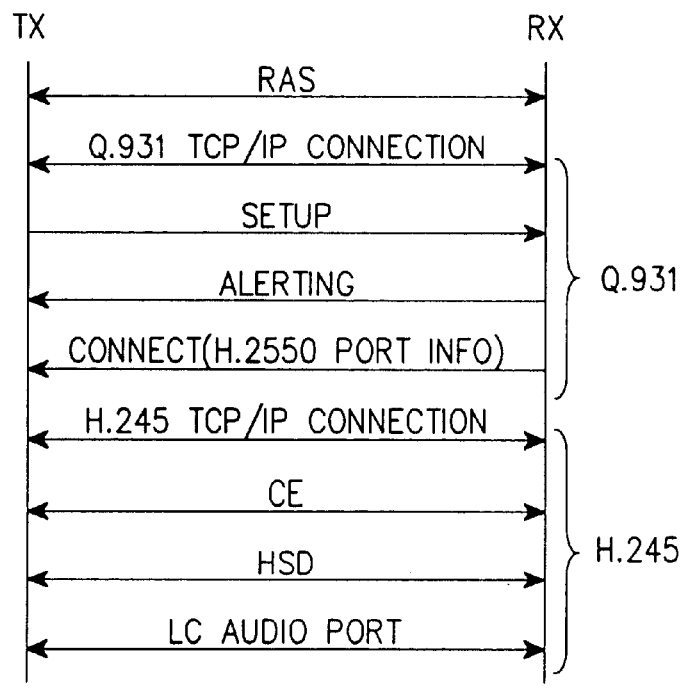
FIG. 2 is a diagram illustrating a protocol performed between the transmission side and the receiving side in a data processing system to which the present invention is applied.

FIG. 2 shows a protocol performned in the signaling path of FIG. 1. As illustrated, H.2250 (Q.931) sets up the TCP/IP connection, and thereafter, H.245 sets up the TCP/IP connection and transmits the voice data.

Figure 3:
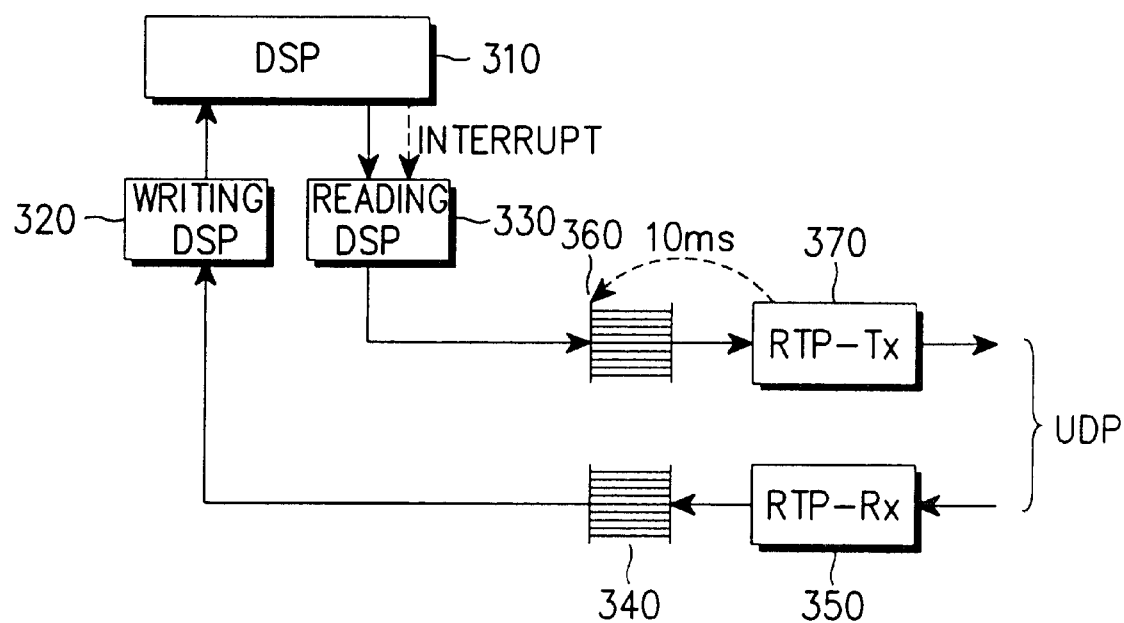
FIG. 3 is a block diagram illustrating a scheme for buffering the jitter processing of a vocoder according to an embodiment of the present invention.

FIG. 3 shows a block diagram illustrating a scheme for buffering the voice data according to an embodiment of the present invention. In FIG. 3, a digital signal processor (DSP) 310 compresses the voice data to be transmitted and then restores/decompresses the received voice data. In addition, the DSP 310 generates an interruption signal to issue a request for either the transmission or the reception of the voice data. The DSP 310 generates the interruption signal at a specific interruption interval depending on the selection of the voice compression technique. As stated above, the DSP 310 produces the interruption period of 30 ms for the G.723.1 compression technique and 10 ms for the G.729 compression technique.

Figure 5:
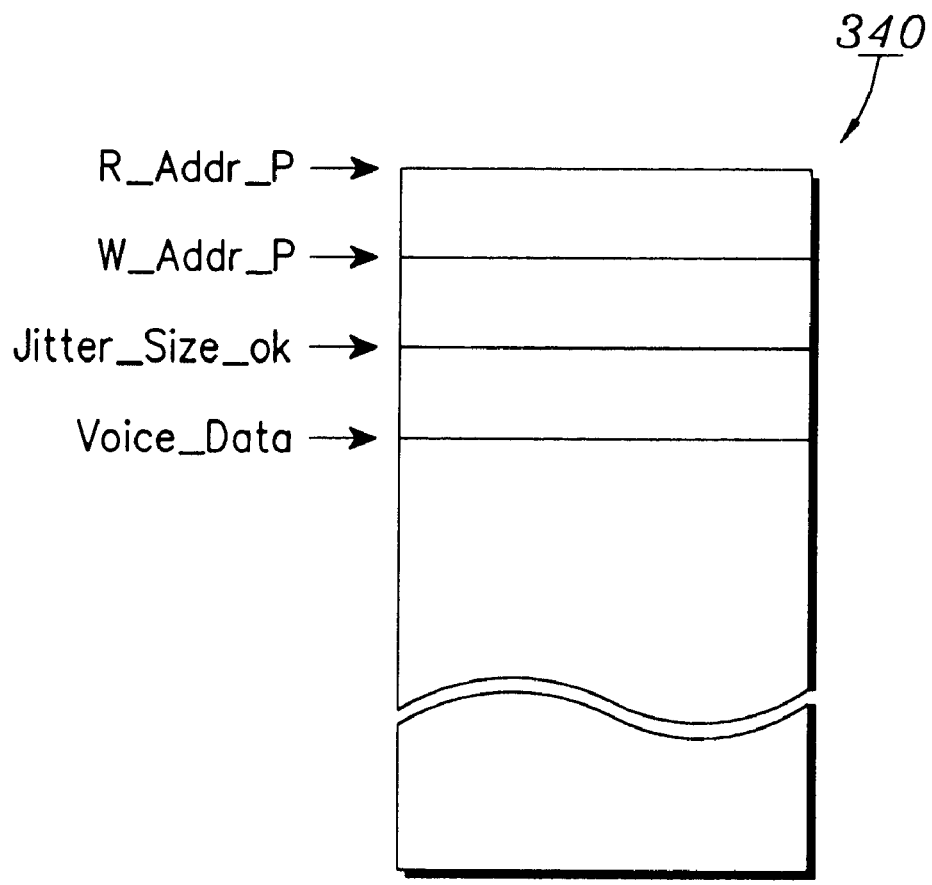

The writing DSP 320 performing an interruption service routine (ISR) function serves to buffer the received voice data and provides the buffered voice data to the DSP 310. The receiving buffer 340 writes therein the voice data received from a receiving RTP (RTP-Rx) 350. For buffering, the writing DSP 320 reads the voice data written in a receiving buffer 340 at every interruption interval and writes the read voice data in the DSP 310. The receiving buffer 340 has the structure as shown in FIG. 5. The RTP-Rx 350 processes the RTP header of the voice data provided from the UDP to extract the actual voice data and writes the extracted actual voice data in a specific area of the receiving buffer 340.

A detailed description of the receiving buffer 340 will be made with reference to FIG. 5. The receiving buffer 340 includes areas for storing a read address (R_Addr_P), a write address (W_Addr_P), an approval (or okay) bit (Jitter_Size_ok), and voice data (Voice_data). The R_Addr_P indicates an address where the voice data is written which will be read later by the writing DSP 320. The W_Addr_P indicates an address where the RTP-Rx 350 will write the received voice data. The approval bit Jitter_Size_ok indicates whether the voice data written in the receiving buffer 340 can be read. For example, when the Jitter_Size_ok is set to "0" indicating the read prevention mode (hereinafter, referred to as a voice data read prevention value), the writing DSP 320 can not access the voice data written in the receiving buffer 340. On the other hand, when the Jitter_Size_ok is set "1" indicating the read approval mode (hereinafter, referred to as a voice data read approval value), the writing DSP 320 can access the voice data written in the receiving buffer 340. Lastly, the voice data area (Voice_Data) stores the actual voice data provided from the RTP-Rx 350.

Figure 4:
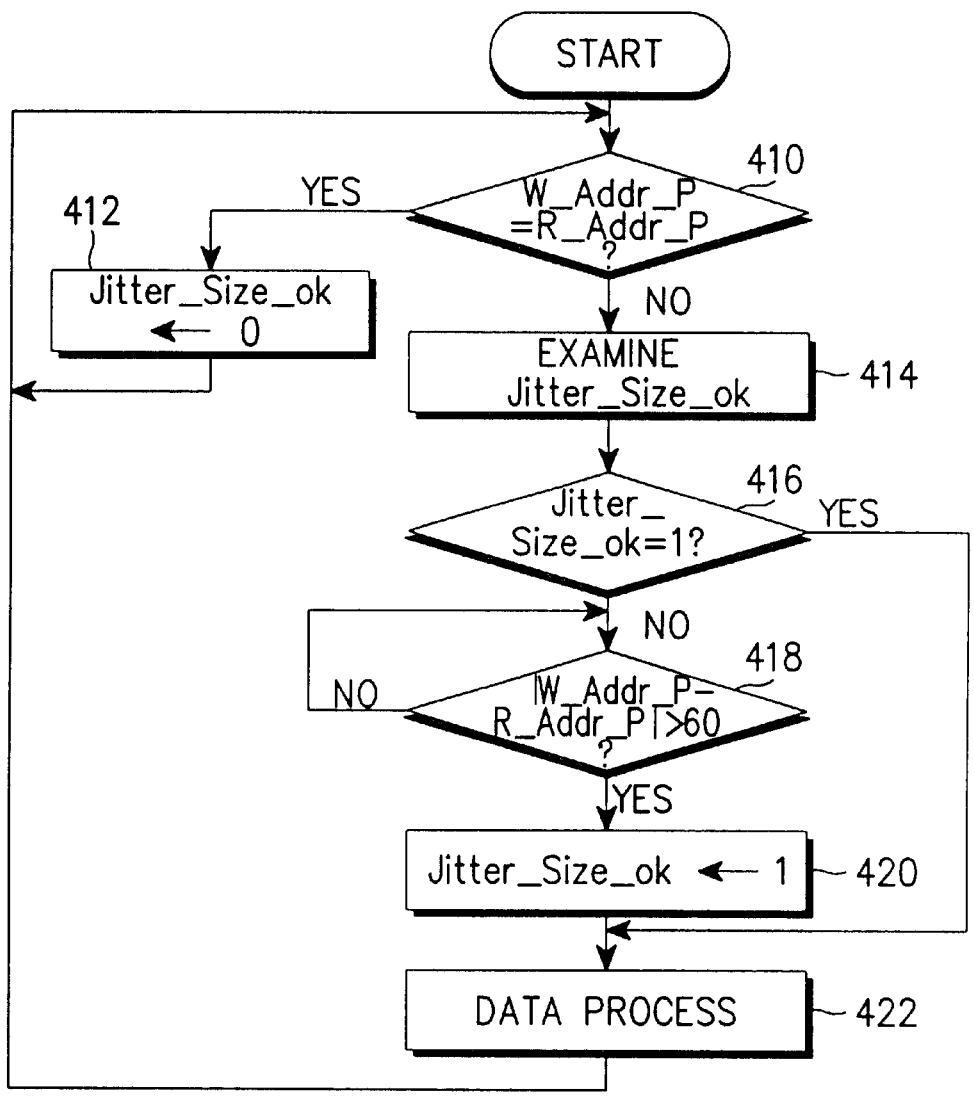
FIG. 4 is a flow chart illustrating a procedure for buffering jitter processing of a vocoder according to an embodiment of the present invention; and, FIG. 5 is a detailed diagram illustrating the receiving buffer of FIG. 3.

The writing DSP 320 performs the operation of reducing a transmission delay in accordance with the procedure illustrated in FIG. 4. In this diagram, when a predetermined amount of the voice data is accumulated in the receiving buffer 340, the approval bit is set to the "voice data read approval value" so that the voice data can be read by a predetermined interval until there is no voice data to be read in the receiving buffer 340. When there is no voice data to read in the receiving buffer 340, the approval bit is set to "voice data read prevention value" to prevent the reading of the voice data from the receiving buffer 340.

Now, a detailed description of the embodiment will be made with reference to the accompanying drawings. The components of H.323 end point, gateway, gatekeeper, multiple control unit, and multipoint controller incorporate the G.723.1 and G.729A voice codecs, which have a sampling period of 30 ms and 10 ms, respectively. Therefore, the interruption service routine (ISR) shown in FIG. 4 is performed at every 30 ms or 10 ms depending on the type of the voice codec used. That is, the ISR buffers the voice data written in the receiving buffer 340 and stores the buffered voice data in the DSP 310 so that the DSP 310 can decode the voice data (payload) of the RTP packet received from the UDP part of the LAN. This procedure is performed by reading the data stored in the receiving buffer (Voice_Rx_Queue) 340 which stores only the voice data (payload) and whose RTP head has been processed by the RTP-Rx 350. Since the present invention relates to the operation of writing the voice data received at the receiving buffer 340 by the DSP 310, a description of the transmitting operation will be avoided herein.

When an interruption signal is generated by the DSP 310, the writing DSP 320 determines in step 410 whether the write address (W_Addr_P) and the read address (R_Addr_P) of the receiving buffer 340 are identical to each other. This is done to determine whether there is a newly received voice data. The W_Addr_P indicates an address where the voice data (payload) with its RTP header-removed will be stored next, and the voice data(payload) was obtained by removing the RTP header from the voice data (RTP payload) received by the RTP-Rx 350. The R_Addr_P indicates an address where the voice data, which will be read by the writing DSP 320, is stored. Therefore, when the W_Addr_P is identical to the R_Addr_P it means that there is no data to read from the receiving buffer 340.

When the W_Addr_P is identical to the R_Addr_P in step 410, the procedure proceeds to step 412 on the judgement that there is no voice data to read. In step 412, the Jitter_Size_ok bit indicating an accessibility of the receiving buffer 340 is set to the voice data read prevention value "0" to prevent the unnecessary access attempts, and then the procedure waits until a predetermined amount (e.g., 60 bytes) of voice data is accumulated in the receiving buffer 340. Here, the 60 bytes are selected as an example to illustrate a scenario where three 20-byte voice cells generated according to G.723.1 are attached to one header in assembling a packet. In this case, the interruption will occur every 30 ms (i.e., the interruption interval is 30 ms).

However, when W_Addr_P is not identical to R_Addr_P in step 410, the writing DSP 320 examines the approval bit Jitter_Size_ok, indicating the accessibility of the receiving buffer 340 in step 414. In other words, if the Jitter_Size_ok is set to "1", it skips steps 418 and 420 and proceeds to step 422. The step 416 is included in order to write the voice data written in the receiving buffer 340 into the DSP 310 without checking whether the predetermined amount of data (e.g. 60 bytes) is accumulated in the Voice RX-Queue at every 30 ms, and whether there is a predetermined amount (60 bytes) of voice data accumulated in the receiving buffer 340. That is, if the examining step 414 is eliminated, the writing DSP 320 will perform the writing operation only when the predetermined amount (60 bytes) of voice data is accumulated in the receiving buffer 340.

However, if the voice data is not received at normal timing due to the transmission delay of the packet, the writing DSP 320 should wait for another interruption interval (i.e., 120 ms). Therefore, in order to solve such waiting above problem, the DSP 320 sets Jitter_Size_ok to the voice data read approval value "1" through steps 416 to 420 when the predetermined amount (60 bytes) of the voice data is accumulated. If Jitter_Size_ok is set to "1" in step 416, the writing DSP 320 can access the voice data through steps 416 and 422 without passing the step 418.

More specifically, after completion of the examination, it is determined in step 416 whether the receiving buffer 340 is accessible (i.e., the Jitter_Size_ok is set to "1"). If it is determined that the receiving buffer 340 is inaccessible (i.e., the Jitter_Size_ok is set to "0"), the writing DSP 320 waits until the predetermined amount (60 bytes) of voice data is accumulated in the receiving buffer 340. In the meantime, if it is determined that the predetermined amount (60 bytes) of voice data is accumulated, the writing DSP 320 sets Jitter_Size_ok to "1" in step 420.

Whether the predetermined amount of voice data is accumulated is determined by comparing the difference value between W_Addr_P and R_Addr_P with the predetermined value. This can be defined as:

$$|W_{Addr} - R_{Addr}| > 60 \qquad (1),$$

wherein $W_{Addr}$ denotes W_Addr_P and $R_{Addr}$ denotes R_Addr_P. Equation (1) is applied to a case where the predetermined amount of the voice data is 60 bytes, i.e., the G.723.1 voice codec is used.

Thereafter, the writing DSP 320 writes the voice data in the DSP 310 on a cell unit basis in step 422, and returns to step 410. If it is determined in step 410 that there is no data to read in the receiving buffer 340, the writing DSP 320 sets Jitter_Size_ok to "0" in step 412. In this manner, it is possible to process the voice data only when the predetermined amount of the voice data is accumulated.

As described above, once a predetermined amount of the voice data is accumulated, the embodiment according to the present invention directly processes the voice data without examining whether the predetermined amount of the voice data is accumulated in the Voice RX-Queue at every 30 ms. The FIG. 4 describes the steps in accessing the voice data stored in the receiving buffer when a predetermined voice data is accumulated. If the predetermined voice data is accumulated within the 30 ms interval, the present invention is designed to transmit one or more sets of the received voice data to be processed by the DSP within the same 30 ms interval, without waiting for the next 30 ms interval dictated by the interruption signal. Thus, the present invention can sometimes transmit the received voice data to the DSP 310 independent of the interruption signal interval so that there is less delay, which was caused by waiting for the next interruption signal in the prior art, thereby reducing the transmission delay. Hence, the delay owing to the jitter buffering can be reduced. Therefore, it is possible to implement a system that satisfies the low delay and jitter requirements.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for processing a voice data in a receiving end of a voice data processing system having a receiving buffer, the method comprising the steps of:
   (a) generating an interruption signal for processing the received voice data at a predetermined interval;
   (b) determining whether the received voice data is accumulated in the receiving buffer;
   (c) in the event that the received voice data is not accumulated in the receiving buffer, setting an approval bit of the receiving buffer to a read prevention mode so that the received voice data cannot be accessed by the system;
   (d) in the event that the received voice data is accumulated in the receiving buffer, setting an approval bit of the receiving buffer to a read approval mode so that the received voice data can be accessed by the system;
   (e) determining whether a predetermined amount of the voice data is accumulated in the receiving buffer when the approval bit is set to the read prevention mode;
   (f) setting the approval bit to the read approval mode from the read prevention mode when the predetermined amount of the voice data is accumulated in the mixing buffer; and,
   (g) reading the voice data written in the receiving buffer and writing the read voice data in a digital signal processor of the system when the approval bit is set to the read approval mode.

2. The method as claimed in claim 1, wherein the step (b) comprises the step of determining that there is no received voice data in the receiving buffer if a read address and a write address of the receiving buffer are identical to each other, or determining that there is received voice data in the receiving buffer if the read address and the write address of the receiving buffer are not identical to each other.

3. The method as claimed in claim 2, wherein the write address represents a location where the voice data is stored in the receiving buffer and the read address represents a location where the received voice data is stored in the receiving buffer.

4. The method as claimed in claim 2, wherein the step (e) comprises the step of determining that the predetermined amount of the voice data is accumulated when the difference between the read address location and the write address location is larger than a predetermined value.

* * * * *